(12) United States Patent
De Benedittis et al.

(10) Patent No.: US 9,655,028 B2
(45) Date of Patent: May 16, 2017

(54) INFORMING A USER EQUIPMENT OF A CELL AND A RADIO BASE STATION SERVING THE CELL ABOUT ACCESS RIGHTS GRANTED TO THE USER EQUIPMENT

(75) Inventors: Rossella De Benedittis, Ulm (DE); Mathias Pieroth, Gilching (DE); Angelo Centonza, Winchester (GB)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 13/318,935

(22) PCT Filed: May 4, 2009

(86) PCT No.: PCT/EP2009/003180
§ 371 (c)(1),
(2), (4) Date: Jan. 30, 2012

(87) PCT Pub. No.: WO2010/127680
PCT Pub. Date: Nov. 11, 2010

(65) Prior Publication Data
US 2012/0129497 A1    May 24, 2012

(51) Int. Cl.
*H04M 1/66* (2006.01)
*H04W 48/02* (2009.01)
*H04W 12/08* (2009.01)

(52) U.S. Cl.
CPC ........... *H04W 48/02* (2013.01); *H04W 12/08* (2013.01)

(58) Field of Classification Search
CPC ........ H04W 12/06; H04W 12/12; H04L 63/08

USPC .......... 455/411, 410, 422.1, 436, 442, 435.1, 455/432.1
See application file for complete search history.

(56) References Cited

U.S. PATENT DOCUMENTS

| | | | |
|---|---|---|---|
| 8,428,013 B2* | 4/2013 | Lee et al. ...................... 370/329 |
| 2004/0243712 A1* | 12/2004 | Sakai et al. ................... 709/227 |
| 2005/0070283 A1 | 3/2005 | Hashimoto et al. ........ 455/435.1 |
| 2005/0071682 A1* | 3/2005 | Kurokawa ..................... 713/201 |
| 2005/0097595 A1* | 5/2005 | Lipsanen et al. ............... 725/25 |
| 2007/0109989 A1* | 5/2007 | Nakagawa et al. ........... 370/328 |
| 2007/0183427 A1 | 8/2007 | Nylander et al. .......... 370/395.2 |
| 2008/0045218 A1* | 2/2008 | Okochi et al. ................ 455/436 |

(Continued)

OTHER PUBLICATIONS

3GPP TS 36.300 V8.8.0 (Mar. 2009), Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8), (157 pages).

(Continued)

*Primary Examiner* — Nghi H Ly
(74) *Attorney, Agent, or Firm* — Harrington & Smith

(57) ABSTRACT

Components of a cellular communication system and methods for operating components of a cellular communication system are disclosed, wherein an access right indication is sent from a network element to a base station which access right indication defines limited access rights of a user equipment to access the radio access network to which the base station belongs. According to embodiments, the access right indication is an access right update updating already defined access rights of the user equipment to access the radio access network.

27 Claims, 6 Drawing Sheets

(56) References Cited

U.S. PATENT DOCUMENTS

2009/0098887 A1* 4/2009 Baek .................... 455/456.1
2009/0264126 A1* 10/2009 Khetawat et al. ......... 455/435.1

OTHER PUBLICATIONS

3GPP TS 36.413 V8.5.1 (Mar. 2009), Technical Specification, $3^{rd}$ Generation Partnership Project; Technical Specification Group Radio Access Network; Evolved Universal Terrestrial Radio Access Network (E-UTRAN); S1Application Protocol (S1AP), (Release 8), (215 pages).
3GPP TR 23.830 V0.3.1 (Mar. 2009), "$3^{rd}$ Generation Partnership Project; Technical Specification Group Services and System Aspects; Architecture Aspects of Home NodeB and Home eNodeB (Release 9)", 41 pgs.
3GPP TS 25.468 V8.1.0 (Mar. 2009), "$3^{rd}$ Generation Partnership Project; Technical Specification Group Radio Access Network; UTRAN Iuh Interface RANAP User Adaption (RUA) Signalling (Release 8)", 43 pgs.
3GPP TS 25.469 V8.1.0 (Mar. 2009), "$3^{rd}$ Generation Partnership Project; Technical Specification Group Radio Access Network; UTRAN Iuh Interface Home NodeB Application Part (HNBAP) Signaling (Release 8)", 57 pgs.

* cited by examiner

INFORMING A USER EQUIPMENT OF A CELL AND A RADIO BASE STATION SERVING THE CELL ABOUT ACCESS RIGHTS GRANTED TO THE USER EQUIPMENT

Informing a user equipment of a cell and a radio base station serving the cell about access rights granted to the user equipment

FIELD OF THE INVENTION

The present invention relates to the field of wireless communication networks. In particular, the invention relates to managing access rights of user equipments regarding access to radio cells.

ART BACKGROUND

Managing access rights which define the rights of a user equipment to access a radio cell is of high importance in wireless communication networks offering services differentiated per user. In particular, cells with small radio coverage, resulting in a high number of base stations per area unit benefit from efficient access right management. An example of a cell with limited radio coverage is a so-called femto cell for indoor private coverage but also rather conventional cells, e.g. macro cells, can benefit from efficient access right handling.

Femto cells are primarily intended to offer radio coverage for indoor applications, e.g. inside the customers premise, to a limited number of users for example to the femto cell owner and possibly also to his family members and friends, or within a small office or a mall to the office employees and to the visitors of the mall, respectively.

3GPP (3rd Generation Partnership project) TR23.830 relates to architecture aspects of femto cells and in particular of home NodeBs and home eNodeBs. As described in this document, a list of allowed user equipment identifications (e.g. international mobile subscriber identities, IMSI) may be maintained in a home NodeB for user equipments which can access the home NodeB or home eNodeB cell.

However, maintaining such a list of allowed user equipments in the home NodeB requires synchronization among different equipments of the mobile network, e.g. among different base stations and between the home NodeB and the network element providing entries into the list. The list comprises a private identification of a user equipment which allows to uniquely identify the user equipment in the RAN or Core network. The private identification of a user equipment is valid permanently (eg., IMSI). Once the private identification is retrievable to unauthorised entities or persons, security and confidentiality is degraded. Therefore usage of a temporary unique private identification is preferred (eg., TMSI).

In view of the above-described situation, there exists a need for an improved technique that efficiently enables a base station of wireless communication network to enforce granted access rights to user equipments.

SUMMARY OF THE INVENTION

This need may be met by the subject-matter according to the independent claims. Advantageous embodiments of the herein disclosed subject-matter are described by the dependent claims.

According to a first aspect of the invention, there is provided a method of operating a base station of a radio access network, the method comprising receiving from a network element an access right indication which defines limited access rights of a user equipment to access the radio access network via that base station and enabling the user equipment to access the radio access network depending on the access right indication. According to an embodiment, the access right indentification is received by the base station in addition to a user authentication result.

Limited access rights in the sense of the herein disclosed subject matter relate to a right granted to the user equipment, which right allows for a limited access to the radio access network (RAN). Herein, "limited access right" denotes an access right which is between full access rights and no access rights, without reaching both extremes. The limitation of the access to the RAN may be of any type, e.g. a limitation in time, a limitation in volume, a limitation in bandwith, a limitation in priority, a limitation to receiving only certain message types, e.g. a limitation to receiving broadcast and paging information only, etc. For example, a limitation in priority may, according to an embodiment, correspond to a certain priority which is granted to the user equipment. As a consequence, if the priority of other users is relatively higher, the relatively lower priority may result in a smaller bandwith or, in another embodiment in a handover to another cell.

Generally, a base station is considered as an entity providing the functionality that enables a user equipment to access network services over an air interface.

According to an embodiment, the base station is a home NodeB (HNB) or home evolved NodeB (HeNB) of a so-called femto technology, i.e. a base station with limited coverage which is connected to an operator's network via a broadband transport technique as eg., DSL or cable connections. According to other embodiments, the base station may be a base station of any other cellular communication network.

According to an embodiment, the network element is a network element of a radio access network, for example a home NodeB gateway (HNB-GW) or a home evolved nodeB gateway (HeNB-GW).

According to other embodiments, the network element is a network element of a core network (CN), i.e. either the Mobile Management Entity (MME) or the Mobile Switching Centre (MSC) or the Serving GPRS Support Node (SGSN).

According to an embodiment, the access right indication fully defines the access rights of the user equipment to access the radio access network via the specific base station. According to other embodiments, the access right indication only partially defines access rights of the user equipment to access the radio access network, for example, according to an embodiment, the access right indication indicates termination of a previously defined access right or limitation of a previously defined access right.

Embodiments where no private user information is provided or stored in the base station provide improved security and confidentiality. This is of particular advantage where the base station is in a customer premises.

According to an embodiment, the method according to the first aspect further comprises providing to the network element an access related request which is related to an access request of the user equipment to the radio access network.

Generally herein, providing a request or an information element to an entity includes e.g. providing the request or the information element for download by the entity or, according to other embodiments, sending the request or the information element in a respective message to the entity, etc.

According to an embodiment, the access related request is comprised in a user equipment register request message or a user equipment initial message which is sent by the base station to the network element.

According to another embodiment of the first aspect, the method comprises receiving in response to the access related request an access related response which comprises the access right indication. For example, according to an embodiment, the access related response is comprised in a user equipment register response from a home NodeB gateway. According to another embodiment, the access related response is contained in a user equipment context setup request from a core network entity, e.g. from a mobile management entity. According to another embodiment, the access related response is contained in a Non Access Stratum (NAS) message or RANAP message from a core entity, e.g. from the MSC or SGSN.

According to a further embodiment of the first aspect, the access related response is an access related response message comprising the access right indication in the form of an information element. For example, according to an embodiment the user equipment access right indication is provided by a mobile management entity (MME) to a home eNodeB during an S1 application protocol (AP) initial context setup procedure including a respective information element. Hence, according to an embodiment a possible implementation would be the inclusion of a respective information element in a known initial context setup request message from the mobility management entity (MME) to the home eNodeB (HENB).

According to a further embodiment, the access right indication is provided to the base station in form of a home NodeB by the home NodeB gateway during a registration procedure, e.g. a home NodeB application protocol (HN-BAP) user equipment registration procedure by including a respective information element in the HNBAP user equipment register accept message from the home NodeB gateway to the home NodeB.

According to a further embodiment, the access right indication is indirectly provided by a Core Network (CN) entity, i.e. either the MSC or the SGSN, to the home NodeB during a Non Access Stratum (NAS) procedure between that CN entity and the accessing UE as additional information to existing NAS messages, e.g. in the MM: Location Area Updating Accept or GMM: Routing Area Updating Accept or GMM: Attach accept message. The Home NodeB intercepts the relevant NAS message from the CN retrieving the UE access right information.

According to a further embodiment, the access right indication is provided by a CN entity, either the MSC or the SGSN, to the Home NodeB gateway as additional information of a RANAP message for the UE connection. Home NodeB gateway extracts the access right information from the RANAP message and provides it to the relevant Home NodeB during a registration procedure, e.g. the HNBAP user equipment registration procedure.

According to an embodiment, the access right indication is an access right update updating already defined access rights of the user equipment to access the radio access network. Hence, according to an embodiment, the method according to the first aspect further comprises receiving from the network element an access related modification request message comprising said access right indication.

For example, according to an embodiment the access right update is provided by a core network entity (e.g. MME), e.g. by using an S1 AP user equipment context modification procedure. For example, the information element may be included in the S1 AP:user equipment context modification request message from the core entity (e.g. MME) to the base station (e.g. home eNodeB).

According to another embodiment, a radio access network entity, e.g. a home NodeB gateway, updates the user access rights in the base station, e.g. by using a home NodeB application protocol procedure, such as, for example, a user equipment registration update procedure. In this embodiment, updated UE access rights can be generated internally the Home NodeB gateway or received from the core (MSC or SGSN) with a connection oriented RANAP message.

According to another embodiment, the access right update is indirectly provided by the CN (MSC or SGSN) to the home NodeB as additional information to existing NAS messages, e.g. an MM: Information message, sent to the affected user equipment.

According to an embodiment, enabling the user equipment to access the radio access network depending on the access right indication includes exploiting the access right indication and, in response hereto, deciding about at least one of resource allocation, user equipment relocation to another layer or to another base station, or user equipment call drop depending on the current resource conditions.

According to a further embodiment of the first aspect, the method comprises exploiting the received access right indication and, in response hereto, providing to the user equipment its actual access rights in the cell provided by the base station. According to an embodiment, the base station provides the actual access rights to the user equipment by using a radio resource control connection reconfiguration procedure. For example, according to an embodiment, the base station provides the actual access rights in the cell to the user equipment by adding this information (i.e. the access rights or a respective access right indication) to a radio resource control (RRC):connection reconfiguration message.

According to other embodiments, the base station informs the user equipment about its actual access rights by using a radio resource control:direct transfer procedure, e.g. by adding the actual access rights in the cell to a radio resource control:direct transfer message from the base station to the user equipment.

According to a further embodiment of the first aspect, the method comprises exploiting the received access right indication and, in response hereto, informing the user equipment about its actual access rights in the cell established by the base station by using any other method, for example a short message service (SMS), or in a network identity and time zone (NITZ) message.

It should be understood, that according to a further embodiment actual access rights of the user equipment may be determined by the base station on the basis of the access right indication. For example, the actual access rights of the user equipment correspond to the access right indication received from the network element if the access right indication fully defines the access rights. According to another embodiment, the actual access rights of the user equipment are determined from the access right indication received from the network element or from access rights stored in the base station.

According to a further embodiment of the first aspect, the access right indication is free of any information which allows to permanently, uniquely identify at least one of the user equipment or the user or the user status. For example, according to an embodiment, the access right indication comprises an additional information on the granted access right in the cell compared to granting access or rejecting access. The access right indication is related to a temporary user equipment identifier, e.g. the user equipment context identity in the radio access network which allows unique temporary identification of the user equipment requesting access to the radio access network. Hence, according to an embodiment, no provision of private user information which allows to uniquely identify the user/user equipment (like an international mobile subscriber identity (IMSI) or the telephone number associated with the SIM card (MSISDN) of the user equipment) is provided to the base station before a user equipment accesses the base station cell. According to an embodiment, only necessary information is provided to the base station only when needed, for example when the user equipment registers to the radio access network. According to other embodiments, private user information is never provided to the base station.

According to a further embodiment of the first aspect, the method comprises receiving from the user equipment the access request which requests access of the user equipment to the radio access network. According to a further embodiment, the method comprises providing, in response to receiving the access request from the user equipment, to the network element the access related request mentioned before.

According to a further embodiment, the method according to the first aspect comprises providing to the user equipment an access related response in response to receiving from the network element the access related response. According to an embodiment, the access related response comprises the actual access rights granted to the user equipment.

According to an embodiment, the base station is adapted to receive and/or store and/or maintain access rights of a user equipment allowed to attach to the cell of the base station.

According to a further embodiment, the base station is adapted to enforce the granted access rights by appropriate actions, e.g., rejecting access to the cell, allowing camping in the cell (i.e. accepting a registration request to the cell of the base station), divert the call to another cell or layer, e.g. a macro cell. According to further embodiments, the base station is adapted to forward paging messages related to the user equipment, pre-empting the call in case that there are higher priority users needing the cell resources, etc. According to a further embodiment, the base station is adapted to compare requests from the user equipment with granted access rights and perform in response hereto respective actions. According to a further embodiment, the base station is adapted to execute the request from a user equipment if comprised in the granted access rights of the user equipment. According to a further embodiment, the base station is adapted to deny execution of a user equipment request if not comprised in the granted access rights of the user equipment. According to a further embodiment, the base station is adapted to indicate granted access rights to the user equipment.

According to a second aspect of the herein disclosed subject-matter, a method of operating a network element which is related to a radio access network is provided, wherein the method comprises receiving from a base station of the radio access network an access related request which is related to an access request of a user equipment to access the radio access network. Further, the method comprises providing to the base station an access right indication which defines limited access rights of a user equipment to access the radio access network.

The entities and actions referred to in the second aspect may be similar or identical to respective actions and entities described with regard to the first aspect. For example, it should be understood that the base station referred to in the second aspect may be, according to embodiments, a home NodeB or a home enhanced NodeB, or, any other base station of a cellular network. Further, an access related request may be for example contained in a user equipment register request or a user equipment initial message. Further, for example, providing an access right indication includes sending a respective message.

According to a third aspect of the herein disclosed subject-matter, a method of operating a user equipment is provided, the method comprising providing to a base station of a radio access network an access request requesting access of the user equipment to the radio access network. Further, the method according to the third aspect comprises receiving in response hereto an access response indicating limited access rights of the user equipment to access the radio access network. For example, according to an embodiment, the access response may indicate the actual access rights of the user equipment to the cell of the base station to which the access request is provided.

According to an embodiment, the method according to the third aspect comprises displaying the limited access rights, e.g. the actual access rights, to a user of the user equipment.

According to a fourth aspect of the herein disclosed subject-matter, a computer program for processing a physical object, namely an indication of limited access rights is provided, the computer program when being executed by a data processor is adapted for controlling the method according to the first aspect or an embodiment thereof.

According to a fifth aspect of the herein disclosed subject-matter, a computer program is provided for processing a physical object, namely an indication of limited access rights, the computer program, when being executed by a data processor, is adapted for controlling the method according to the second aspect or an embodiment thereof.

According to a sixth aspect of the herein disclosed subject-matter, a computer program for processing a physical object, namely an indication of limited access rights, is provided, the computer program, when being executed by a data processor, is adapted for controlling the method according to the third aspect or an embodiment thereof.

According to an embodiment, an indication of limited access rights is an access right indication as defined in the first, second and third aspect or an embodiment thereof. According to another embodiment, an indication of limited access rights is any physical object (e.g message, information element, etc.) which is derived from said access right indication or which is a precursor of said access right indication from which the access right indication is derived.

According to a seventh aspect of the herein disclosed subject-matter, a base station of a radio access network is provided, the base station comprising a receiving unit for receiving an access right indication which defines limited access rights of a user equipment to access the radio access network. Further, the base station comprises a radio resource manager being configured for allocating radio resources for the user equipment depending on the access right indication.

The base station may send the access right indication applied to the user equipment to the affected user equipment. The base station may additionally store or retrieve the received access right indication locally/in local storage of those user equipments only which are currently accessing to the cell.

According to an eighth aspect of the herein disclosed subject-matter, a network element related to a radio access network is provided, the network element comprising a receiving unit configured for receiving from a base station of the radio access network an access related request which is related to an access request of a user equipment to access the radio access network. Further, the network element comprises an access right determination unit for determining an access right indication which defines limited access rights of the user equipment to access the radio access network. Further, the network element comprises a sending unit configured for sending to the base station the access right indication determined by the access right determination unit.

According to an embodiment, the network element is an entity of the radio access network. According to a further embodiment of the eighth aspect, the network element is a gateway between the base station and a core network, wherein the network element further comprises an interface for communication with the core network element. An example of such a network element is e.g a home NodeB gateway.

According to other embodiments, the network element is a core network element, for example a mobile management entity (MME) or a mobile switching centre (MSC) or a Serving GPRS Support Node (SGSN).

According to an embodiment, the network element is adapted to react on events related to changed access rights which are limited to some extent and to enforce updated access rights, e.g. by alignment of involved base stations. For example, according to an embodiment, a timer expiry may indicate the end of the granted access right of a user equipment to a cell of a base station. In such a case, according to an embodiment, the network element, e.g. a home NodeB gateway, enforces updated access rights by sending a message with an access right indication indicating the updated access rights towards the affected base station (e.g. home NodeB) indicating the affected user equipment context and the updated access rights and, optionally, their duration period. According to a further embodiment, related to 3G, a network element in the form of a core network node, e.g. MSC or SGSN, is adapted to react on events related to change access rights and to enforce updated access rights by an alignment of the involved entities, i.e. the user equipment and the home NodeB or home NodeB gateway, sending dedicated NAS or RANAP messages for the affected UE connection. According to a further embodiment, related to 4G, a network element in the form of a core network node, e.g. an MME, is adapted to react on events related to changed access rights which are limited to some extent and to enforce updated access rights by an alignment of involved home eNodeB nodes. A timer expiry may indicate the end of the granted access right of a user equipment to a home evolved NodeB cell. The core network node enforces updated access rights by sending a message with updated access rights towards the affected home eNodeBs indicating the user equipment context and the updated access rights and, optionally, their duration.

According to a ninth aspect of the herein disclosed subject-matter, a user equipment is provided, the user equipment comprising a receiving unit for receiving an access response, the access response indicating limited access rights of the user equipment to access a radio access network. Further, the user equipment comprises a display and a controller configured for displaying the access rights on the display. The controller may be configured for retrieving the received access right from the receiving unit. As mentioned before, the access rights may be the actual access rights granted to the user equipment, in one embodiment.

As used herein, reference to a computer program is intended to be equivalent to a reference to a program element and/or a computer-readable medium containing instructions for controlling a computer system to coordinate the performance of one of the above-described methods. The computer program may be implemented as computer-readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or other programmable device to carry out the intended functions. The computer program may be available from a network, such as the WorldWideWeb, from which it may be downloaded. The herein disclosed subject-matter may be realized by means of a computer program respectively software. However, the herein disclosed subject-matter may also be realized by means of one or more specific electronic circuits respectively hardware. Furthermore, the herein disclosed subject-matter may also be realized in a hybrid form, i.e. in a combination of software modules and hardware modules.

In the following, there will be described exemplary embodiments of the herein disclosed subject-matter with reference to a method of operating a base station, a method of operating a network element, a method of operating a user equipment, a computer program, a base station, a network element and a user equipment. It has to be pointed out that of course any combination of features relating to different aspects of the herein disclosed subject-matter is also possible. In particular, some embodiments have been described with reference to apparatus type claims, whereas other embodiments have been described with reference to method type claims. Further, some embodiments have been described with reference to the operation of a base station while other embodiments have been described with reference to operation of a network element or a user equipment. However, a skilled person will gather from the above and the following description that, unless otherwise notified, in addition to any combination of features belonging to one aspect also any combination between features relating to different aspects or embodiments, for example even between features of the apparatus type claims and features of the method type claims, as well as features relating to operation of a base station, features relating to operation of a network element and features relating to operation of a user is considered to be disclosed with this application. For example, an embodiment of the method of operating a base station which comprises a step of receiving from a network element a particular message or information implicitly discloses a method of operating the network element which comprises sending the respective message or information.

The aspects and embodiments defined above and further aspects and embodiments of the herein disclosed subject-matter are apparent from the examples to be described hereinafter and are explained with reference to the drawings but to which the herein disclosed subject-matter is not limited.

DETAILED DESCRIPTION

Figure 1:
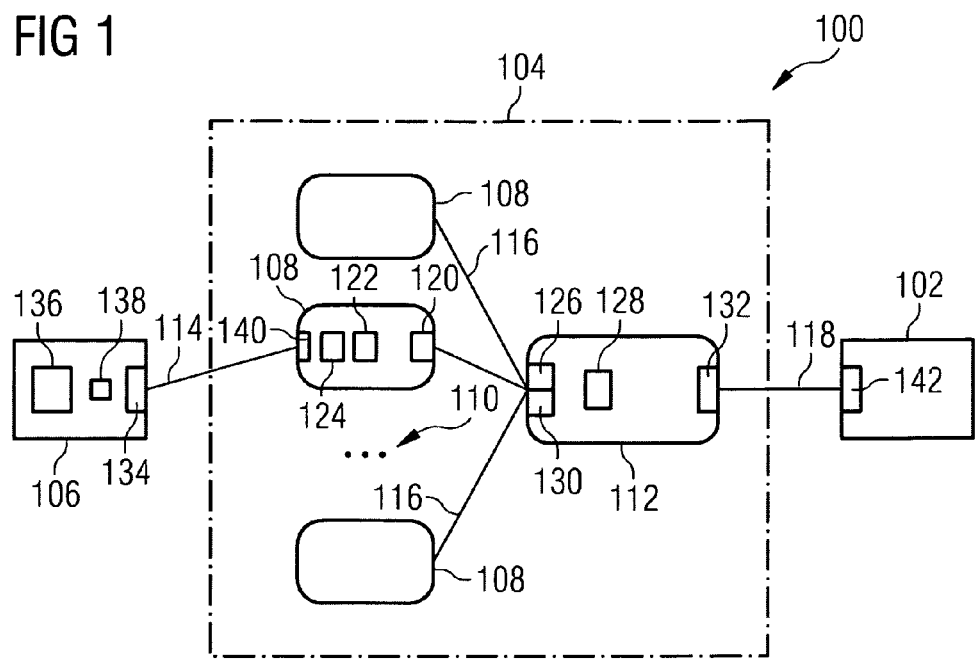
FIG. 1 shows a wireless communication network according to embodiments of the herein disclosed subject-matter.

The illustration in the drawings is schematic. It is noted that in different figures, similar or identical elements are provided with the same reference signs or with reference signs which are different from the corresponding reference signs only within the first digit or an appended character.

In the following, aspects and embodiments of the herein disclosed subject-matter are described with reference to existing 3G and 4G femto technology, thereby allowing a skilled person to implement embodiments and aspects of the herein disclosed subject-matter by modifying existing 3G or 4G femto technology. However, from the above and the following description it will be apparent to the skilled person that the herein disclosed subject-matter is also applicable to any other cellular wireless communication system.

Femto technology is a recent development within 3GPP (3rd Generation Partnership Project) for a standard for cells offering limited radio coverage to a restricted number of users. These cells, also named "femto" cells generally belong to a closed subscriber group (CSG). A CSG defines a series of access rights offered to users subscribed to the group when accessing the core services via cells of that CSG. One cell or more than one cell can belong to a CSG. Users can be subscribed to one or more than one CSG.

Femto cells are primarily intended to offer radio coverage for indoor, e.g. inside the customers premise to the femto cell owner and possibly also to this family members and friends, or, within a small office or mall, to the office employees and the visitors of the mall, respectively.

Users allowed to access core services via a femto cell will benefit of a privileged access, i.e. they will get access to the requested services at a lower tariff with respect to when they access to the same services via a regular macro cell.

On the other hand, users which do not have access rights to a femto cell, i.e. which do not belong to its CSG, are generally not allowed to camp but for emergency services. As usual, "camping" refers to allowance of a registration attempt of a user equipment to the respective cell. For users which do not have access rights to a femto cell, even when they are tolerated to camp, according to an embodiment, the camping is allowed for receiving broadcast and paging information only. Further, such users (user equipments) are rejected or diverted to a neighbor macro cell as soon as they ask for a regular service.

It is therefore of fundamental importance both for the end users (user equipments) and for the femto cell, in particular to the base station of the femto cell, to know the user equipment access rights when camping: the end user then knows whether the user equipment can have full services at convenient fees or whether the user equipment has been granted only with limited access rights. Further, having knowledge of the user equipment access rights, the femto cell knows how to handle the camped user equipment, e.g. how to serve it, how to reject or divert it to a more suitable cell, etc.

According to embodiments of the herein disclosed subject-matter, femto cells operate in closed or hybrid access modes. Closed access mode means granting access for regular services only to users which are CSG members or users which are subscribed to the femto cell group. Even in a closed access cell it may be required or at least advantageous to accept user equipments which are not CSG members e.g. for one or more of the following reasons: First reason may be that the user equipment asks for an emergency service. Another reason may that the user equipment has access rights to another femto cell broadcasting the same location area code (LAC) as the femto cell the user equipment tries to access. If such a user equipment is not allowed to camp, i.e. if its registration attempt via this cell is denied, the user equipment would add the femto cell LAC to the forbidden list of location area codes and thus will be unable to access its own femto cell when, later on, coming under its radio coverage.

Another reason would be that the user equipment accesses a forbidden femto cell in the same tracking area as one of its accessible cells. This might happen for example for LTE user equipments (LTE=3GPP long-term evolution) that have no CSG capabilities, i.e. which do not understand CSG specific cell parameters, and where the network does not signal any physical layer parameters split between CSG cells and macro cells. If such a user equipment is not allowed to camp, i.e. if its registration attempt via this cell is denied, the whole frequency on which the tracking area operates would be banned for a certain time period, e.g. 300 seconds, preventing the user equipment from accessing also allowed cells on that frequency.

Hence, user equipments which are not CSG members or which are not subscribed to the femto cell group are therefore accepted with limited services according to an embodiment. It is important for the femto cell to know the access rights of the accepted user equipments for applying a relocation policy, e.g. whether dropping or diverting a call, as well as for the user equipments in order to understand its service requests fail and what fees it is supposed to pay for.

Hybrid access mode of a femto cell means a granting access right to all users but with preference for the subscribed users/CSG members. "Preference" means that in case of any resource shortage, the not preferential users can either be dropped, rate-downgraded or diverted to another layer, for example to a neighbour macro cell. Within a hybrid access cell, it can therefore happen that different users have different access rights and different priorities. The femto cell needs to know which priority applies to which user for proper resource and call handling, admitted users would like to know which access rights they have been granted.

Hence, in order to provide a simple and secure way to inform both the user equipment and the femto cell about the user equipment access rights when camping on the cell, a base station, a network element and a user equipment are operated in accordance with aspects and embodiments of the herein disclosed subject-matter.

FIG. 1 shows a wireless communication network 100 in accordance with embodiments of the herein disclosed subject-matter. The wireless communication network 100 comprises a core network indicated at 102 in FIG. 1, a radio access network 104 and user equipments 106, one of which is shown in FIG. 1. The radio access network 104 comprises one or more base stations 108, e.g. home NodeBs (HNB). According to an embodiment, the base station 108 acts as a radio cell and a radio network controller for, e.g., radio resource management, mobility handling, user plane routing, encryption, etc. The dots indicated at 110 in FIG. 1 indicate that there may be more than the three base stations 108 shown in FIG. 1. However, the skilled person will be aware of the fact that according to other embodiments, there may be only a single base station 108 or two base stations 108.

The radio access network 104 further comprises a network element 112 connecting the base stations 108 to the core network 102. According to an embodiment, the network element is a home NodeB gateway (HNB-GW) acting towards the core network 102 as a HNB concentrator, as is described e.g. in 3GPP TR23.830, version V0.3.1, March 2009.

The base station 108 and the user equipment 106 are adapted to communicate, indicated at 114, via an air interface.

Further, the base station 108 and the network element 112 are configured for communicating with each other, indicated at 116, via respective interfaces. For example, signalling protocols exchanged between the base station 108 in the form of a HNB and the controlling HNB-GW 112 may be home NodeB application part (HNBAP) protocols of an UTRAN (UMTS Terrestrial Radio Access Network) Iuh interface, e.g. as defined in 3GPP TS25.469, V8.1.0, March, 2009. Further signalling protocols exchanged between the HNB and the controlling HNB-GW are besides the HNBAP for femto radio access network specific signalling procedures the radio access network application protocol user adaption signalling protocols (RUA) for connection oriented and connection-less signalling transfer between the user equipment and the core network 102 across the femto radio access network (104), as defined in 3GPP TS 25.468, V8.1.0, March 2009.

The network element 112 and the core network 102 are adapted for communication with each other, indicated at 118, via respective interfaces.

In accordance with embodiments of the herein disclosed subject-matter, the base station 108 comprises a receiving unit 120 for receiving from the network element 112 an access right indication which defines limited access rights of a user equipment, e.g. of the user equipment 106, to access the radio access network 104. Further, the base station 108 comprises a controller 122 for configuring the base station 108 such that the user equipment 106 is enabled to access the radio access network 104 depending on the access right indication received from the network element 112. For example, the base station 108 comprises, according to an embodiment, a radio resource manager 124 which is configured for allocating radio resources for the user equipment 106 depending on the access right indication received from the network element 112.

In accordance with embodiments of the herein disclosed subject-matter, the network element 112 comprises a receiving unit 126 configured for receiving from the base station 108 an access related request which is related to an access request of the user equipment 106 to access the radio access network 104. Further, the network element 112 comprises an access right determination unit 128 for determining an access right indication which defines limited access rights of the user equipment to access the radio access network 104. Further, the network element 112 comprises a sending unit configured for sending to the base station 108 the access right indication which has been determined by the access right determination unit 128 (sending unit 130). According to an embodiment, the network element 112 comprises an interface 132 for communication with the core network 102.

According to an embodiment, the user equipment 106 comprises a receiving unit 134 for receiving an access response which indicates access rights of the user equipment 106 to access the radio access network 104. According to a further embodiment, the user equipment 106 comprises a display 136 and a controller 138 configured for displaying the (limited) access rights received by the receiving unit 134 on the display 136. It should be understood, that, in accordance with these embodiments, the base station 108 may comprise a sending unit 140 for providing to the user equipment 106 the access response. Further, for example also the core network 102 may comprise, according to an embodiment, an interface 142 which forms the counterpart for the interface 132 of the network element 112, thereby allowing communication 118 between the network element 112 and the core network 102.

According to an embodiment, when the user equipment 106 accesses for the first time a femto cell, the respective HNB 108 starts the HNB application protocol user equipment registration procedure with the controlling HNB-GW 112. According to an embodiment, the HNB-GW is responsible to perform user access control, i.e. to check user access rights against the entered femto cell. According to an embodiment, the HNB-GW checks the access rights against the entered femto cell by using user equipment subscription list. According to such embodiments, the registration procedure includes the following messages: HNBAP: UE register request from the HNB to the HNB-GW and HNBAP: UE register accept from the HNB-GW to the HNB. In accordance with the herein disclosed subject-matter, an information element is added to the HNBAP:UE register accept as follows:

The status of the introduced information element, i.e. the UE access rights information element, is optional. This means that the information element can be absent, which could be inferred as the UE having full access rights to the cell. However, according to other embodiments, the status of the information element is mandatory. The type of the information element refers to the limitation of the access rights and may be for example "limited access"; "low priority"; etc.

According to an embodiment, the UE register accept message may comprise the following parameters: message type, UE identity, context ID, limited UE access rights.

According to a further embodiment, the access right indication, for example the information element "UE access rights" may be used to handle changes in the user equipment access rights. For example, according to an embodiment, a new HNBAP message is introduced, named for example "UE register modification request", from the HNB-GW 112 to the HNB 108, by which the HNB-GW 112 can inform the HNB 108 about changes in the UE registration data, as for example changes in the UE access rights to the cell due to expiration of a temporary access right.

According to an embodiment, such a message can be coded as having parameters: message type, context ID, choice mode, UE access rights, new UE access rights (limited), context ID, new context ID. Hence, according to an embodiment, the access rights as well as the context ID may be changed by means of a UE register modification request message. According to an embodiment, the UE register modification request message comprises the present UE access rights known to the HNB as well as the new access rights which are made available to the HNB by the UE register modification request message. According to other embodiments, only the new UE access rights are included in the UE register modification request message, hence, not having the present UE access rights in this message.

According to an embodiment, the UE register modification request message is acknowledged by the receiving peer via another HNBAP message, named for example "UE register modification response". Such a message may include for example the message type and a context ID.

According to another embodiment when a CSG user equipment 106 accesses for the first time a CSG femto cell, the respective HNB 108 starts the HNB application protocol user equipment registration procedure with the controlling HNB-GW 112 for allocating the user equipment context. According to an embodiment, the core network 102 is responsible to perform user access control, i.e. to check user access rights against the entered CSG femto cell by using user equipment subscription list. According to such embodiments, the registration procedure is concluded between the HNB and the HNB-GW with the UE context allocation before the core network has checked the user equipment access rights to the HNB. The core network checks the user equipment access rights upon reception from the HNB-GW of the RANAP: UE Initial message carrying the HNB CSG identity and the user equipment NAS access request message to the core. Hence, according to a general embodiment, limited access rights are provided to the RAN as part of a response message related to granting the access rights to the UE. In accordance with the herein disclosed subject-matter, two alternatives are proposed as follows:

Alternative 1) an information element is added to the NAS message from the core when replying to the UE NAS access request including the UE granted access rights to the accessed HNB. NAS messages to be improved with this optional information element can be: the MM: Location Area Updating Accept, the GMM: Routing Area Updating Accept; the GMM: Attach Accept. The core network can signal updated UE access rights using another NAS message, e.g. the MM: Information or the GMM: Information, sent when needed on the dedicated connection with that UE. The UE shall read its granted access right to the cell upon reception of the RRC: Downlink Direct Transfer message from the HNB carrying the core NAS message. The HNB can read the UE granted access rights parsing NAS messages received from core via the HNB-GW within RUA messages.

Alternative 2) an information element is added to RANAP messages from the core, whenever there is the need to communicate the granted or updated UE access right to a CSG HNB. RANAP messages can be:
RANAP messages carrying either the MM: Location Area Updating Accept or the GMM: Routing Area Updating Accept or the GMM: Attach Accept message. This can generally apply when providing UE access right the first time
Connection oriented RANAP: UE Specific Information Indication message
HNB-GW shall inform the HNB of the granted or updated UE access right adding a corresponding information element to HNBAP messages, e.g. to the HNBAP: UE Register Modification Request message. HNB can inform the served UE adding such information element received from the HNB-GW in an RRC: Downlink Direct Transfer message.

Generally, according to an embodiment, the access right indication comprising the limited access right is included in a response message to an access request, which response message is sent from the HNB-GW to the HNB, or, in another embodiment, in an access modification request message (update message) from the HNB-GW to the HNB. According to embodiments, the access request or access update is one of the above mentioned HNBAP or RRC messages.

Figure 2:
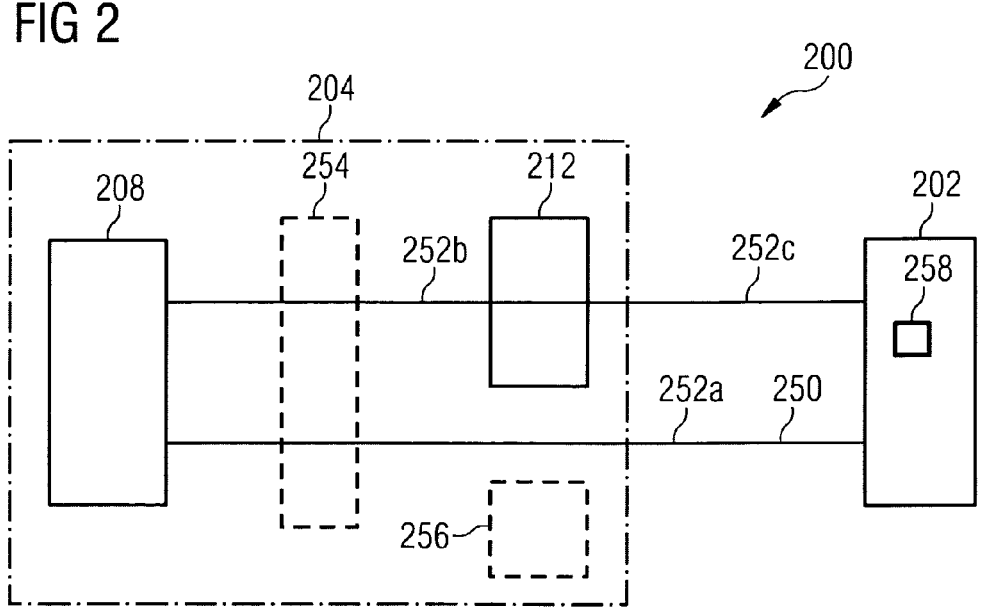
FIG. 2 shows a further wireless communication network in accordance with embodiments of the herein disclosed subject-matter.

FIG. 2 shows another wireless communication system 200 which is explained in further detail by referring to a 3GPP long-term evolution (LTE)/evolved UTMS terrestrial radio access network (E-UTRAN). However, it should be understood that such references to existing technology is made only for convenience and easier understanding of the invention but it is in no way limiting and the disclosed embodiments can readily transferred to other systems.

The wireless communication system 200 comprises an evolved packet core (EPC) 202 and an evolved radio access network 204. User equipments are not shown in FIG. 2. The femto radio access network architecture for the LTE/E-UTRAN case comprises a home evolved NodeB (HeNB) 208 acting as radio cell and radio network controller (RNC). The HeNB can be directly connected to a mobile management entity (MME) 258 of the evolved packet core 202 supporting mobility related non-access stratum procedures and interfacing the evolved packet core (EPC), indicated at 250 in FIG. 2. According to a further embodiment, the HeNB can be connected to the mobile management entity via a gateway (home evolved NodeB gateway, HeNB-GW), as described in 3GPP TS36.300, V8.8.0, March 2009. The wireless communication system 200 of FIG. 2 has a set of S1 interfaces to connect the HeNB 208 to the EPC 202. In particular, according to an embodiment, the S1 interface is defined as an interface 252a between the HeNB 208 and the core network 202, as an interface 252b between the HeNB 208 and the HeNB-GW 212 and as an interface 252c between the HeNB-GW 212 and the core network 202. The exemplary signalling protocol exchanged between the HeNB and the controlling mobility management entity in the EPC 202 (S1 application protocol in the illustrated embodiment) is described in 3GPP TS36.413, V8.5.1, March 2009. Optionally, the communication between the base station, i.e. the HeNB 208 and the HeNB-GW 212 is performed via a security gateway indicated at 254 in FIG. 2. Further, the HeNB may have associated therewith a HeNB management system, indicated at 256 in FIG. 2.

Having regard to LTE technology, when a user equipment (UE) accesses for the first time a femto cell and after a radio resource control (RRC) connection has been established, the HeNB generates an initial UE message to the MME of the EPC which contains information elements, such as the CSG ID of the accessed cell, allowing the MME to perform UE access control. As the MME performs UE access control, it has to handle the UEs allowed CSG list. If the access control is successful, the MME starts the S1AP initial context setup procedure with the accessed HeNB. During this procedure the following messages are exchanged: First, an S1AP: initial context setup request is sent from the MME to the HeNB, indicated at 258 in FIG. 2, to the HeNB 208; and, second, the S1AP:initial context setup response from the HeNB 208 to the MME 258.

In accordance with embodiments of the herein disclosed subject-matter, a new information element is introduced into the S1AP:initial context setup request message as a UE access right information element. The status of this new information element is optional and the type refers to the limitation of the access rights an may be for example "limited access"; "low priority"; etc. If the new information element is absent, it could be inferred that the UE has "full access rights to the cell", according to one embodiment.

In order to handle changes in the UE access rights, e.g. following the expiration of a temporary access right, according to an embodiment a UE context modification request message comprises the new information element "UE access rights".

It should be noted that the embodiments described above are applicable also for UEs which support only 3GPP release 6 or earlier versions, i.e. it is not necessary that the UE supports 3GPP release 8.

In order to describe exemplary embodiments of communication of UE access rights to user equipments, in the following message sequence charts are described which again relate either to a 3G case, as shown in FIG. 1, or to a 4G case shown in FIG. 2. However, it should be understood that reference to these cases is made only for illustration purposes and should be considered in no way as limiting.

Figure 3:
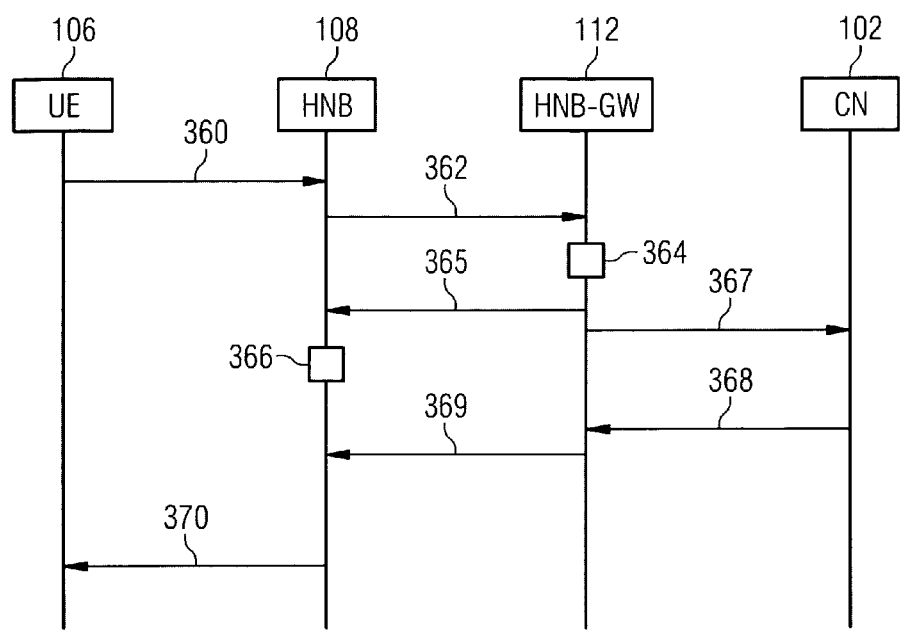
FIG. 3 shows a message sequence according to embodiments of the herein disclosed subject-matter.

FIG. 3 shows a message sequence chart according to embodiments of the herein disclosed subject matter. According to an embodiment, the message sequence chart of FIG. 3 is applicable in a system as illustrated in FIG. 1. Accordingly, FIG. 3 refers to a user equipment 106, a HNB 108, a HNB-GW 112 and a core network 102.

First, in an attempt to camp in the cell of the HNB 108, the user equipment 106 sends a UE access request 360 to the HNB 108, thereby requesting access to the radio access network (indicated at 104 in FIG. 1). For example, the UE access request may be an RRC:initial direct transfer, according to an embodiment including a non-access stratum e.g. for a location updating request.

In response to the received UE access request 360, the HNB 108 sends to the HNB-GW 112 an access related request message 362, e.g. in the form of a UE register request message including for example UE information, information on HNB and the cell, etc. According to an embodiment, the UE register request is of the HNB application protocol including UE identity, UE non-access stratum packet data units, etc.

In the illustrated embodiment, the HNB-GW 112 handles a permanent unique identifier of the user equipment, for example an international mobile subscriber identity (IMSI). Hence, in the case illustrated in FIG. 3, the HNB-GW 112 is configured for access control of the user equipment.

The HNB-GW 112 then checks the UE access rights to this cell of the HNB 108 and informs the HNB 108. According to an embodiment, if the UE has the limited access right to access the cell of the HNB 108, the HNB-GW allocates a UE context and then informs the HNB 108. Checking of the access rights of the user equipment 106 and the actions undertaken by the HNB-GW 112 are indicated at 364 in FIG. 3. The HNB-GW 112 then sends to the HNB 108 an access related response message 365 including the access right indication. For example, according to an embodiment, the access related response message 365 is a UE register response message, including for example limited access rights of the user equipment in the cell of the HNB 108, duration information of the access rights, etc.

The HNB 108, upon reception of the UE access related response message 365, checks if access of the user equipment is allowed. If yes, the HNB 108 allocates resources for the user equipment 106, stores the user equipment access rights and their duration period and correspondingly responds to the user equipment, e.g. acts on a user equipment core correspondingly to the received user access rights. These actions are indicated at 366 in FIG. 3.

In addition to sending the UE register response message 365 to the HNB 108, the HNB-GW 112 further sends a corresponding message 367, e.g. a RANAP:initial UE message including for example UE access rights, non-access stratum packet data units, etc. to the core network 102. In response hereto, the core network 102 transmits a response message 368, e.g. an RANAP:direct transfer message to the HNB-GW 112 in response to the request message 367. In response to the response message 368 from the core network 102, the HNB-GW 112 sends a user adaption message, e.g. an RANAP user adaption message 369 to the HNB 108, e.g. in the form of a RUA:direct transfer message including for example UE context, core non-access stratum packet data units etc.

The HNB 108 forwards the received user adaption message 369, e.g. in the form of a radio resource control message 370 to the user equipment 106. According to an embodiment, the access response message 370 is a RRC: downlink direct transfer message which includes for example core packet data units, and optionally UE access rights.

Figure 4:
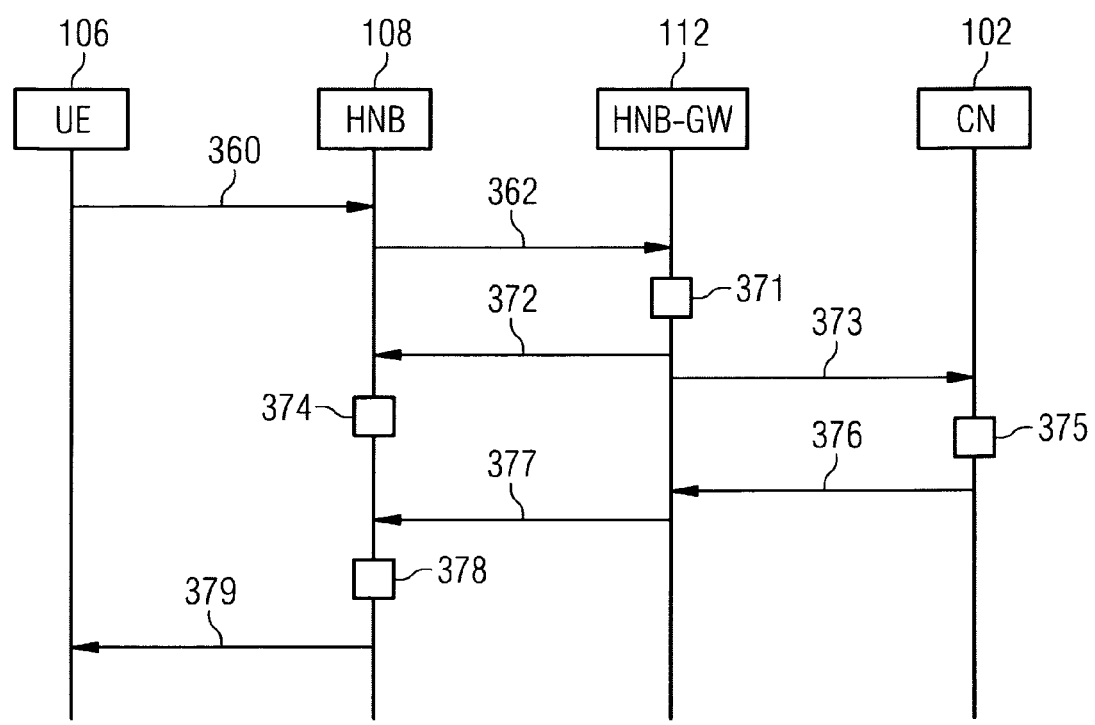
FIG. 4 shows another message sequence according to embodiments of the herein disclosed subject-matter.

FIG. 4 relates to a message sequence chart according to embodiments of the herein disclosed subject matter. According to an embodiment, the message sequence chart of FIG. 4 is applicable in a system as illustrated in FIG. 1, wherein UE access control is performed in the core 102 and with, according to an embodiment, UE access rights in non-access stratum messages.

According to an embodiment, a UE access request 360 is transferred from the user equipment 106 to the HNB 108. As in the case shown in FIG. 3, the HNB sends in response hereto an access related request message 362, e.g. a UE register request message to the HNB-GW 112.

In the case of FIG. 4, the HNB-GW is handling a permanent unique identifier white list, e.g. an IMSI white list, only for non-CSG user equipments. Hence, upon receiving the access related request message 362, the HNB-GW 112 checks, at 371, if UE and HNB are CSG members. Further, a UE context is allocated and then the HNB is informed by an access related response message 372, e.g. an UE register response message including the allocated UE context, etc. Moreover, a respective message 373 is sent to the core network 102, e.g. in the form of a RANAP: initial UE message including the UE access request 360 non-access stratum packet data unit, the cell CSG, etc.

Upon receiving the access related response message 372, the HNB 108 stores the UE context for the next signalling exchange, indicated at 374. In response to receiving the message 373, the core network 102 checks, indicated at 375 in FIG. 4, the UE access rights to the cell CSG and replies to the UE accordingly. In particular, the core network 102 responds to the HNB-GW 112 in a respective response message 376, e.g. an RANAP:direct transfer message including non-access stratum e.g. location updating accept with UE granted access rights to the CSG HNB, etc. In response to the response message 376 from the core network 102, the HNB-GW 112 sends a user adaption message 377 to the HNB 108, e.g. in the form of a RUA:direct transfer message including for example the UE context and core non-access stratum packet data unit 376.

Upon receiving the user adaption message 377, the HNB 108 parses the non-access stratum packet data units for determining whether access of the user equipment is allowed to the cell of the HNB 108. If the access is allowed, the HNB allocates resources for the user equipment, stores UE access rights and optionally, their duration period, and optionally, acts on the user equipment call according to the received user equipment access rights. These steps taken by the HNB 108 in response to receiving the user adaption message 377 are indicated at 378 in FIG. 4.

In response to these steps, the HNB 108 forwards to the user equipment an access response message 379, e.g. in the form of a RRC:downlink direct transfer message, including for example the core non-access stratum packet data unit 376, etc.

Figure 5:
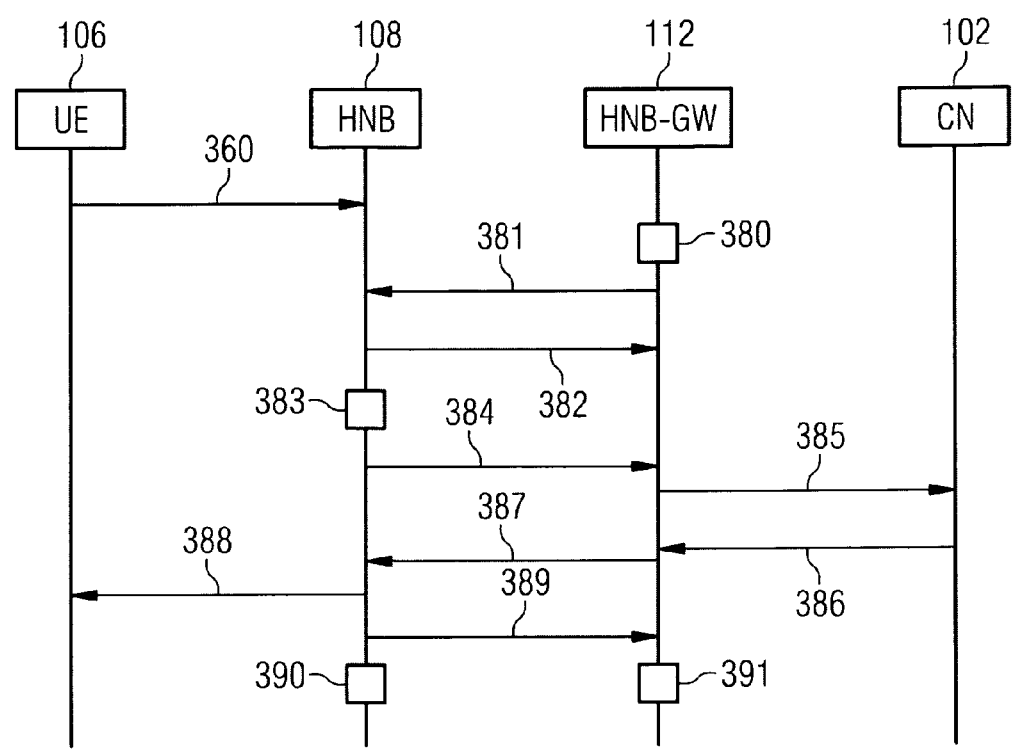
FIG. 5 shows another message sequence according to embodiments of the herein disclosed subject-matter.

FIG. 5 relates to a message sequence chart according to embodiments of the herein disclosed subject matter. According to an embodiment, the message sequence chart of FIG. 5 is applicable in a communication system as shown in FIG. 1. In particular, FIG. 5 relates to a user equipment registration modification triggered by the HNB-GW.

According to an embodiment, the user equipment sends to the HNB a UE access request 360 as described with regard to FIG. 3. In response hereto, the message sequences as described with regard to FIG. 3 may be performed. As in FIG. 3, the HNB-GW handles a permanent unique user equipment identifier list (IMSI white list, for example).

FIG. 5 then considers the case where an event occurred that caused a change of the UE access rights (e.g. if an access duration exhausted or due to an update from the core, etc.), indicated at 380 in FIG. 5. It should be understood that the changed UE access rights are limited access rights in accordance with embodiments of the herein disclosed subject matter. In response to the changed UE access rights, the HNB-GW 112 sends to the HNB 108 an access related modification request message 381, e.g. a UE register modification request message according to HNB application protocol, including for example, UE context, updated UE access rights (which are limited), etc.

In response to receiving the access related modification request message 381, the HNB 108 sends to the HNB-GW 112 an access related modification response message 382, e.g. a UE register modification response message according to the HNB application protocol, which message contains for example the UE context, the updated, limited UE access rights, etc.

In response to the access related modification request message 381, the HNB 108 updates the UE access rights as indicated in the message and acts, according to embodiments of the herein disclosed subject-matter, as follows:

(A) If a call is running for a UE with expired access rights: According to a first alternative, the HNB 108 releases the call or, according to a second alternative, the HNB 108 relocates the call to a more suited cell or, according to a third alternative, the HNB waits till the call is normally released and then erases the UE context, or, any other suitable alternative action may be performed.

(B) If a call is not running for the user equipment 106 with expired access rights, the UE context is erased.

The above-mentioned exemplary actions under (A) and (B) which the HNB 108 may perform in response to the UE register modification request message 381 are indicated at 383 in FIG. 5.

In the course of performing one or more of the above-mentioned actions, the HNB 108 sends a user adaption message 384 to the HNB-GW 112, e.g. in the form of a RUA:direct transfer message which comprises for example the UE context of the user equipment 106, a RANAP:Iu release request, etc.

In response hereto, the HNB-GW 112 sends to the core network 102 a release request message 385, e.g. in the form of a RANAP:Iu release request message. In response hereto, the core network 102 sends to the HNB-GW a respective release command message 386, e.g. in the form of a RANAP:Iu release command message.

In response to receiving the release command message 386, the HNB-GW 112 sends to the HNB 108 a user adaption release command message 387 e.g. in the form of a RUA:direct transfer message comprising for example the UE context, a RANAP:Iu release command, etc.

In response to receiving the user adaption release command message 387, the HNB 108 sends to the user equipment 106 an access response message, e.g in the form of a connection release message 388, such as a RRC:connection release request message. Further, the HNB 108 sends to the HNB-GW a disconnect message 389, e.g. in the form of a RUA:disconnect message.

In response hereto, both the HNB and the HNB-GW releases the UE context, indicated at 390 and 391, respectively.

Figure 6:
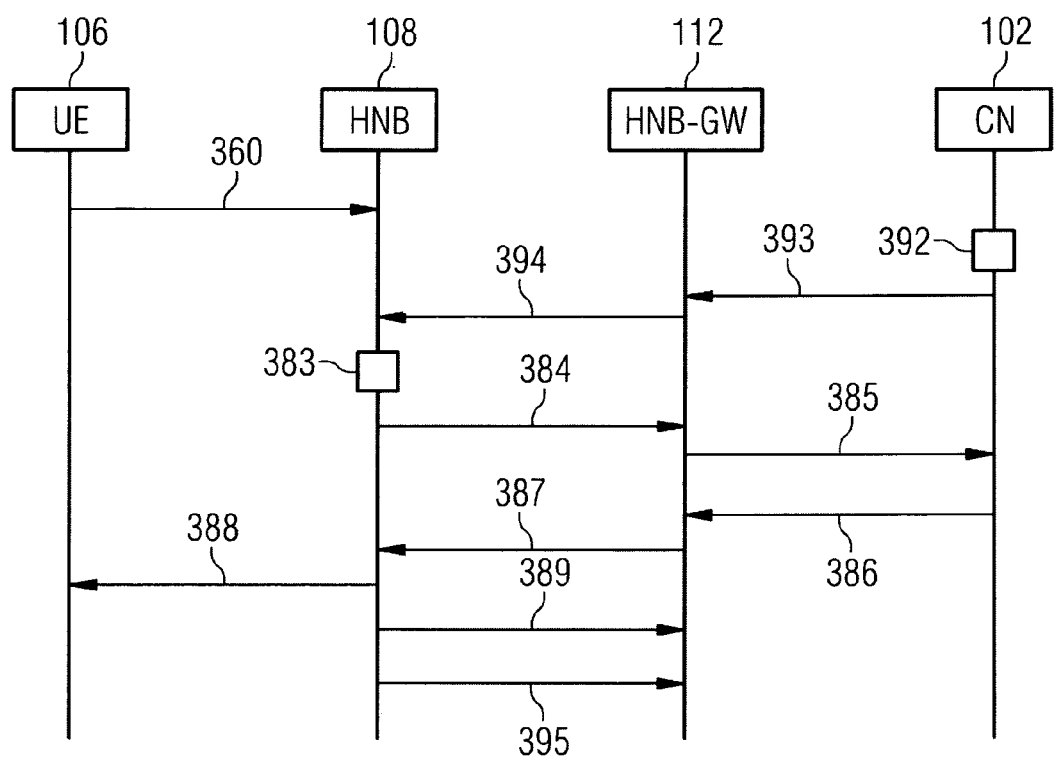
FIG. 6 shows another message sequence according to embodiments of the herein disclosed subject-matter.

FIG. 6 shows a message sequence chart according to embodiments of the herein disclosed subject-matter, e.g. for a wireless communication system as shown in FIG. 1. FIG. 6 relates to an UE access rights modification triggered by core NAS messages.

Initially, limited access rights may be communicated with the user equipment 106 according to the message sequence shown in FIG. 3, e.g. in a case wherein the HNB-GW handles a UE permanent unique identifier white list, e.g. in the form of an IMSI white list. However, according to other embodiments, initial access rights may be communicated with the user equipment according to other message sequences, e.g. the message sequence shown in FIG. 4.

In accordance with the message sequence shown in FIG. 3, a UE access request is transferred in a respective message 360, e.g. in an RRC:initial direct transfer which comprises for example a non-access stratum e.g for location updating, from the user equipment 106 to the HNB 108.

In FIG. 6 is then considered the case where an event occurred that caused a change of the user equipment access rights (e.g. since an access duration exhausted, etc.), indicated at 392 in FIG. 6, resulting in limited access rights. In response hereto an access related modification request message 393, e.g. an updated user access rights message, is sent from the core network 102, where the event indicated at 392 has been taken into account, to the HNB-GW. According to an embodiment, the access related modification request message 393 is a RANAP:direct transfer which, for example, includes a non-access stratum packet data unit e.g. MM: Information with the updated, limited user equipment access rights.

In response to the access related modification request message 393, the HNB-GW 112 sends to the HNB 108 a further access related modification request message 394, e.g. in the form of a user adaption message such as an RUA:direct transfer message which includes, for example the user equipment context, the RANAP:direct transfer 393, etc.

Upon reception of the further access related modification request message 394 from the HNB-GW 112, the HNB 108 updates the user equipment access rights as indicated by the access right indication contained in the access related modification request messages 393 and 394. Further, according to an embodiment, the HNB 108 acts as described with reference to FIG. 5 in item 383. Accordingly, these actions are referred to at 383 also in FIG. 6.

In response to the actions indicated at 383 in FIG. 6, the message sequence in FIG. 6 continues similar to the respective messages sequence in FIG. 5. Hence, messages 384 to 389 in FIG. 6 correspond to the respective messages of FIG. 5, the description of which is not repeated here. Further to the disconnect message 389, in the case shown in FIG. 6 the HNB 108 sends a UE deregister request message 395 to the HNB-GW.

Figure 7:
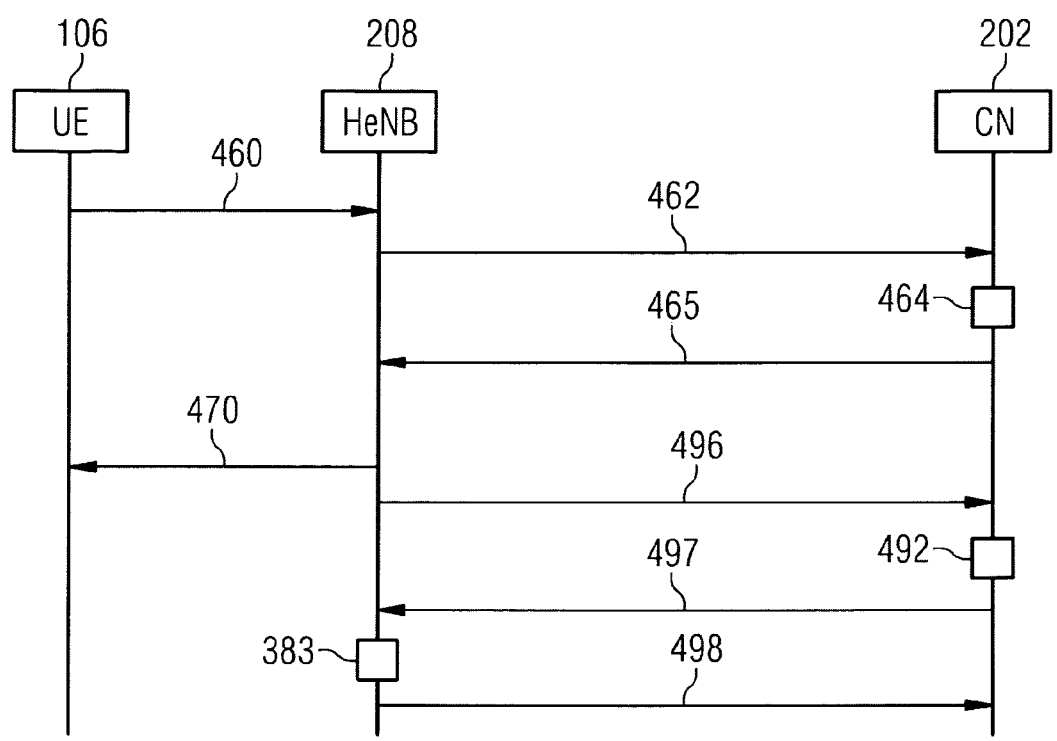
FIG. 7 shows another message sequence according to embodiments of the herein disclosed subject-matter.

FIG. 7 shows a message sequence chart according to embodiments of the herein disclosed subject-matter, for example for a wireless communication system of the type shown in part in FIG. 2. In particular, FIG. 7 refers to a user equipment 106, a HeNB 208, and a core network 202. It should be understood that in the case shown in FIG. 7, the core network 202 (or a core network element) forms the "network element" as defined e.g. in the claims.

According to an embodiment, the user equipment 106 sends a UE access request message 460 to the HeNB 208, the UE access request message 460 requesting access to the respective radio access network (indicated at 204 in FIG. 2), e.g. requesting camping in the cell of the HeNB 208.

In response hereto, the HeNB 208 sends an access related request 462 to the core network 202, the receiving element of which in this case acts as a network element according to the eighth aspect of the herein disclosed subject-matter.

In response to receiving the access related request message 462, the core network 202 checks whether the UE has access rights to access the cell of the HeNB 208; if the user equipment has such access rights, the core network 202 initiates UE context establishment. These actions which are performed by the core network 202 in response to the message 462 are indicated at 464 in FIG. 7.

In response to the above-mentioned actions. indicated at 464 in FIG. 7, the core network 202 sends an access related response message 465 to the HeNB 208, wherein the access related response message 465 comprises the access right indication indicating the limited access right of the user equipment 106 to access the radio access network to which the HeNB 208 belongs (indicated at 204 in FIG. 2).

In response to the access related response message 465, the HeNB 208 forwards a user equipment access response message 470 to the user equipment 106. The user equipment access response message 470 may optionally include an indication of the granted limited access rights, a temporary access right duration, etc. Further, the HeNB 208 sends in response to the access related response 465 a response confirmation message 496 to the core network 202, e.g. in the form of an initial context setup response message.

Further in FIG. 7 is illustrated the case of an access right update updating already defined access rights of the user equipment to access the radio access network. Hence, this considered the case that an event occurred that caused a change of the user equipment access rights (e.g. in the case the access duration is exhausted), indicated at 492 in FIG. 7, resulting in limited UE access rights. It should be mentioned that these events are not necessarily considered by the core network in other embodiments.

In response to the events that caused the change in the user equipment access rights, 492, resulting in limited UE access rights, the core network 202 sends an access related modification request message 497 to the HeNB 208, e.g. in the form of a UE context modification request message comprising for example the UE context, the updated user equipment access rights in the cell of the HeNB 208, etc.

In response to receiving the access related modification request message 497 which includes an access right indication in the form of an access right update, the HeNB according to an embodiment performs the actions as exemplarily defined at 383 in FIG. 5 and FIG. 6. Hence, these actions are referred to at 383 also in FIG. 7 and are not repeated here.

In response to the actions taken by the HeNB 208 in response to the access related modification request message 497 which includes the access right indication in the form of an access right update, the HeNB 208 sends a confirmation message 498 to the core network 202, e.g. in the form of a UE context modification response message.

According to further embodiments of the invention, any component of the wireless communication systems 100, 200, e.g. the interfaces and entities of the user equipment, the base station, the gateways, the core network, etc. are provided in the form of respective computer program products which enable a processor to provide the functionality of the respective elements as disclosed herein. According to other embodiments, any such component may be provided in hardware. According to other—mixed—embodiments, some components may be provided in software while other components are provided in hardware.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above-described embodiments and aspects of the herein disclosed subject-matter, one can state:

Components of a cellular communication system and methods for operating components of a cellular communication system are disclosed, wherein an access right indication is sent from a network element to a base station which access right indication at least partially defines access rights of a user equipment to access the radio access network to which the base station belongs. According to embodiments, the access right indication is an access right update updating already defined access rights of the user equipment to access the radio access network.

Further, in summary the following advantages and features may be achieved according to embodiments of the herein disclosed subject matter:

No provision of private user information like IMSI or MS-ISDN to the HNB/HeNB before UE accesses the HNB/HeNB cell but provide necessary information to HNB/HeNB when UE registers to the Home RAN Authorisation of a UE accessing to the HNB cell is done in Core Network (4G and 3G) or HNB-GW (for 3G only) and result of authorisation specifying the UE access rights is provided back to the HNB/HeNB together with the UE context information which includes NO private identification of the UE but an identification of the context to allow distinction between several UEs attached to the HNB/HeNB cell New Information Element to existing messages (S1.AP Initial Context Setup for 4G is provided; HNBAP UE Register Response for 3G) is suggested for providing access rights in HNB/HeNB cell of a UE and optionally the UE Access Rights duration via UE Context Setup or UE Registration procedures between the HeNB and the core and between the HNB and the HNB-GW respectively For 3G, when access control is done by the core (i.e. both UE and HNB belong to a CSG) there are two possibilities: 1) either the HNB-GW has the IMSI white list so that it can autonomously provide to the HNB the appropriate UE access rights indication or 2) the HNB-GW, or directly the HNB, derives this information parsing the NAS messages from the core. In this case, an additional IE (e.g. "UE Access Rights") should be added to the existing NAS messages granting the UE access (i.e. to the MM: Location Area Updating Accept; GMM: Routing Area Updating Accept; GMM: Attach Accept). Alternatively, such new IE can be added to the RANAP message carrying any of those NAS messages: in this case HNB-GW detects the IE from RANAP and sends it to HNB via HNBAP (i.e. via the new UE Register Modification Request message). Advantage of alternative 2 is that the HNB-GW does not need to retrieve the UE IMSI nor to handle the IMSI white list and, in case of modified NAS messages, no change is needed to HNBAP (HNB can directly get the needed infos); disadvantage is that changes the core (and to UE is NAS messages are used) are required. While the UE is attached to the HNB/HeNB cell, the granted access rights may change and alignment of all involved nodes at least UE & HNB/HeNB with the new access rights and the nodes perform appropriate actions to enforce the new access rights. For 4G, this can be achieved via the existing UE Context Modification procedure whereas for 3G two alternatives are possible: alternative 1: alignment via UE register modification request/response; alternative 2: alignment via UE register response including the duration information of the granted access rights.

For 3G, when access control is done by the core, there are two possibilities: 1) either the HNB-GW autonomously updates the UE access rights in the cell (because it handles the IMSI white list and e.g. relevant timers for temporary subscription); or 2) the HNB-GW, or directly the HNB, derives this information parsing the NAS messages from the core. In this case, an additional IE ("UE access rights") may be added to existing NAS messages updating its access rights. Alternatively, such IE can be added to the RANAP message carrying those NAS messages: in this case the HNB-GW detects the new IE from RANAP and sends it to HNB via HNBAP (i.e. via the new UE Register Modification Request message).

New message for updating access rights in 3G HNB cell of a UE and optionally their duration via new messages UE register modification request/response between the HNB and the HNB-GW For 3G, HNB-GW node is adapted to react on events related to changed access rights and to enforce updated access rights by alignment of involved HNB nodes. A timer expiry may indicate the end of the granted access right of a UE to a HNB cell. HNB-GW node enforces updated access right by sending message with updated access rights towards the affected HNB indicating the affected UE context and the updated access rights and optionally their duration.

For 4G, CN node is adapted to react on events related to changed access rights and to enforce updated access rights by alignment of involved HeNB node. A timer expiry may indicate the end of the granted access right of a UE to a HNB cell. CN node enforces updated access right by sending message with updated access rights towards the affected HeNB indicating the UE and the updated access rights and optionally their duration.

HNB/HeNB may be adapted to receive, store, maintain access rights of a UE allowed to attach to the HNB/HeNB cell and to enforce the granted access rights by appropriate actions eg reject access to the cell, allow camping in the cell, divert the call to another cell/layer (e.g. macro); forward paging messages related to the UE, preempt the call in case there are higher priority users needing the cell resources; compare requests from UE with granted access rights, execute the request from a UE if comprised in granted access rights of the UE, deny execution of a UE request if not comprised in granted access rights of the UE to indicate granted access rights to the UE UE is adapted to indicate the granted access rights to the user of the UE

LIST OF REFERENCE SIGNS:

100 wireless communication network
102 core network component (CN)
104 radio access network (RAN)
106 user equipment (UE)
108 base station (BS)
110 indication of further UEs
112 network element (NE)
114 communication between BS and UE
116 communication between NE and BS
118 communication between NE and CN
120 receiving unit of BS
122 controller of BS
124 radio resource allocator of BS
126 receiving unit of NE
128 access right determination unit of NE
130 sending unit of NE
132 interface of NE for communication with CN
134 receiving unit of UE
136 display of UE
138 controller of UE
140 sending unit of BS
142 interface of CS for communication with NE
200 wireless communication network
202 core network component (EPC)
204 radio access network (RAN)
208 base station (BS)
212 home e-nodeB gateway (HeNB-GW)
250 communication between BS and EPC
252a,252b,252c S1 interface
254 security gateway (SeGW)
256 BS management system
258 mobility management entity (MME)
360 access request
362 access related request message
364 actions undertaken by the NE
365 access related response message
366 actions undertaken by BS
367 message from NE to CS
368 response message from CS to NE
369 user adaption message
370 access response message
371 check if UE and BS are CSG members
372 access related response message
373 message sent from NE to CS
374 storing UE context
375 checking UE access rights
376 response message in response to check 375
377 user adaption message
378 steps undertaken by BS
379 access response message
380 event causing change of UE access rights
381 access related modification request message
382 access related modification response message
383 actions undertaken by BS in response to message 382
384 user adaption message
385 release request message
386 release command message
387 user adaption release command message
388 connection release message
389 disconnect message
390,391 release of UE context
392 event causing change of UE access rights 393 access related modification request message from CN to NE
394 further access related modification request message from NE to BS in response to message 393
395 UE deregister request message
460 access request message
462 access related request message
464 actions performed by CN in response to message 462
465 access related response message
470 access response message
492 event causing change in UE access rights
496 response confirmation message
497 access related modification request message
498 confirmation message

The invention claimed is:

1. Method of operating a base station of a radio access network, the method comprising: receiving at the base station, from a network element of the radio access network, an access right indication used by the base station to define limited access rights of a user equipment to radio resources of said radio access network via said base station, where the access right indication comprises a user equipment identifier to identify the user equipment within the radio access network; checking, by the base station, the limited access rights of the user equipment against a user equipment subscription list based on the access right indication, wherein resources are provided to the user equipment based on the user equipment subscription list; receiving at the base station from said network element of the radio access network, based upon an event at said network element, an access related modification request message comprising a new access right indication regarding said user equipment; and the base station changing the limited access rights of said user equipment to access said radio access network via said base station depending on said new access right indication.

2. Method according to claim 1, further comprising
providing, from the base station, to said network element of said radio access network, an access related request being related to an access request of said user equipment to said radio access network; and
receiving, at the base station, from said network element of said radio access network, an access related response in response to the access related request, said access related response comprising said access right indication.

3. Method according to claim 2, further comprising
receiving from said user equipment said access request requesting access of said user equipment to said radio access network;
providing to said network element, from the base station, said access related request in response to receiving said access request from said user equipment;
providing, from the base station, to said user equipment, an access response in response to receiving from said network element said access related response.

4. Method according to claim 2, wherein said access related response is the access related response message comprising said access right indication in the form of an information element.

5. Method according to claim 1, wherein said access right indication comprises a temporary user equipment identifier which allows temporary identification of said user equipment requesting access to said radio access network.

6. The method as in claim 1 further comprising:
transmitting from the base station to the network element an access related request message based, at least partially, upon the received access request message, where the access related request message comprises the access right indication and information regarding the base station.

7. Method according to claim 6, the method further comprising:
displaying an indicator of said limited access rights to a user of said user equipment.

8. A non-transitory program storage device readable by a machine, tangibly embodying a computer program for processing a physical object, namely an indication of limited access rights of a user equipment, the computer program, when being executed by a data processor, being adapted for controlling the method as set forth in claim 1.

9. The method according to claim 1 where the limited access rights comprise at least one limited access right which is not for emergency services.

10. Method of operating a network element related to a radio access network, the method comprising: receiving, from a base station of said radio access network, an access related request regarding radio resources of said radio access network, which is related to an access request of a user equipment that is requesting the radio resources; and providing by the network element, to said base station, an access right indication, where the access right indication defines limited access rights of the user equipment to access said radio access network and comprises an identifier used to identify the user equipment within the radio access network, wherein the base station is configured to check the limited access rights of the user equipment against a user equipment subscription list based on the access right indication, wherein resources are provided to the user equipment based on the user equipment subscription list.

11. The method of claim 10 further comprising:
based upon an event at the network element, transmitting from the network element of the radio access network to the base station an access related modification request message comprising a new access right indication regarding the user equipment, where the new access right indication is configured to allow the base station to change the limited access rights of the user equipment to access the radio access network via the base station depending on the new access right indication.

12. The method of claim 10, where the access related request is received by the network element from the base station based at least partially upon the access request of the user equipment being received by the base station, and further comprising transmitting from the network element to the base station an access related response, where the access related response comprises the access right indication.

13. The method of claim 12 where the access related response is an access related response message comprising the access right indication in the form of an information element.

14. The method of claim 10 where the access right indication comprises a temporary user equipment identifier which allows temporary identification of the user equipment requesting access to the radio access network.

15. The method of claim 10 further comprising sending from the network element to the base station a modified access right indication which includes the identifier used to identify the user equipment.

16. The method of claim 10 where the limited access rights comprise at least one limited access right which is not for emergency services.

17. Base station of a radio access network, the base station comprising: a receiver configured to receive an access right indication from a network element of the radio access network, where the access right indication defines limited access rights to radio resources of said radio access by a user equipment and an identifier used to identify the user equipment within the radio access network, where the receiver is configured to receive an access related modification request message from the network element comprising a modified access right indication; and a radio resource manager configured for allocating radio resources for said user equipment with the base station depending on said access right indications, where the radio resource manager is configured to check the limited access rights of the user equipment against a user equipment subscription list based on the access right indication, and provide radio resources to the user equipment based on the user equipment subscription list, where the radio resource manager is configured to update the allocated radio resources depending at least partially on the modified access right indication.

18. The base station as in claim 17 where the limited access rights comprise at least one limited access right which is not for emergency services.

19. Network element related to a radio access network, the network element comprising: receiver configured to receive from a base station of said radio access network an access related request, where the access related request is related to an access request of a user equipment, received at the base station, requesting radio resources of said radio access network; a radio resource manager configured to determine an access right indication for the base station which defines limited access rights of said user equipment to the radio resources of said radio access network, wherein the base station is configured to check the limited access rights of the user equipment against a user equipment subscription list based on the access right indication, wherein resources are provided to the user equipment based on the user equipment subscription list.

20. Network element according to claim 19, wherein the network element is a gateway between said base station and a core network, the network element further comprising:
an interface for communication with said core network.

21. Network element according to claim 19, the network element being a network element of a core network.

22. The network element as in claim 19 further comprising a transmitter configured to, based upon an event at the network element, transmit from the network element of the radio access network to the base station an access related modification request message comprising a new access right indication regarding the user equipment, where the new access right indication is configured to allow the base station to change the limited access rights of the user equipment to access the radio access network via the base station depending on the new access right indication.

23. User equipment comprising: a receiver configured to receive an access response from a base station, the access response indicating limited access rights of said user equipment to radio resources of a radio access network, where the access response is configured based upon an access related modification request message received by the base station from a network element, and wherein the base station is configured to check the limited access rights of the user equipment against a user equipment subscription list based on the access right indication, wherein resources are provided to the user equipment based on the user equipment subscription list; a display; and controller configured for displaying an indicator of the at least one limited access right on the display.

24. The user equipment as in claim 23 where the limited access rights comprise at least one limited access right which is not for emergency services.

25. A method comprising: transmitting from a user equipment in a radio access network an access request message, the access request message requesting radio resources for the user equipment to access the radio access network; receiving by the user equipment, in response to the transmitting of the access request message and checking of the limited access rights of the user equipment against a user equipment subscription list based on the access request message, an access response, the access response indicating limited access rights of the user equipment to the radio resources of the radio access network, where the access response is configured based upon an access related modification request message received by the base station from a network element; and displaying an indicator of the at least one limited access right on a display of the user equipment.

26. The method as in claim 25 where the access response is configured based upon the access related modification request message being configured based upon an event at the network element, the access response comprising a new access right indication regarding the user equipment.

27. The method as in claim 25 where the at least one limited access right is not for emergency services.

* * * * *